(12) United States Patent
Nishi et al.

(10) Patent No.: US 7,007,768 B2
(45) Date of Patent: Mar. 7, 2006

(54) WORK VEHICLE HAVING OVERRIDABLE AUTOMATIC ENGINE STOP CIRCUIT

(75) Inventors: Keishiro Nishi, Sakai (JP); Masao Takagi, Sakai (JP); Satoshi Machida, Sakai (JP); Kenji Kato, Sakai (JP); Masashi Osuga, Sakai (JP)

(73) Assignee: Kubota Corporation, Osaka (JP)

( * ) Notice: Subject to any disclaimer, the term of this patent is extended or adjusted under 35 U.S.C. 154(b) by 199 days.

(21) Appl. No.: 10/397,056

(22) Filed: Mar. 25, 2003

(65) Prior Publication Data

US 2004/0026150 A1    Feb. 12, 2004

(30) Foreign Application Priority Data

Aug. 6, 2002    (JP)    ............... 2002-229091

(51) Int. Cl.
*B60K 28/04* (2006.01)

(52) U.S. Cl. ...................................... 180/273; 180/53.8
(58) Field of Classification Search ................ 180/271, 180/272, 273, 279, 281, 286, 289, 53.1, 53.8
See application file for complete search history.

(56) References Cited

U.S. PATENT DOCUMENTS

| | | | | |
|---|---|---|---|---|
| 3,569,726 A | * | 3/1971 | Reid et al. .................. | 307/10.6 |
| 3,838,748 A | * | 10/1974 | Gray et al. .................. | 180/273 |
| 4,509,614 A | * | 4/1985 | Bando et al. ................ | 180/273 |
| 4,699,561 A | * | 10/1987 | Tee ............................. | 414/699 |
| 4,934,462 A | * | 6/1990 | Tatara et al. ................ | 172/2 |
| 5,109,945 A | * | 5/1992 | Koga .......................... | 180/273 |
| 5,203,440 A | | 4/1993 | Peterson, Jr. et al. | |
| 5,377,777 A | * | 1/1995 | Moore et al. ............... | 180/272 |
| 5,551,523 A | * | 9/1996 | Berg et al. .................. | 180/273 |
| 5,577,876 A | * | 11/1996 | Haeder et al. .............. | 414/699 |
| 5,616,964 A | * | 4/1997 | Peterson, Jr. ............... | 307/9.1 |
| 5,711,391 A | * | 1/1998 | Brandt et al. ............... | 180/273 |
| 6,135,230 A | * | 10/2000 | Schenck et al. ............ | 180/273 |
| 6,189,646 B1 | | 2/2001 | Brandt et al. | |
| 6,226,902 B1 | * | 5/2001 | Heyne ......................... | 37/348 |

FOREIGN PATENT DOCUMENTS

| | | |
|---|---|---|
| JP | 63-125443 | 5/1988 |
| JP | 01-155037 | 6/1989 |

* cited by examiner

*Primary Examiner*—Ruth Ilan
(74) *Attorney, Agent, or Firm*—The Webb Law Firm

(57) ABSTRACT

A work vehicle has an engine (1), a PTO shaft (6, 7) driven by power from the engine, an operator's seat (19), an operator's presence sensor (26) for detecting presence/absence of an operator at the operator's seat, and an automatic engine stop unit (39) operable to automatically stop the engine in response to detection of the operator's absence at the operator's seat. The work vehicle includes a utility member (A) for the vehicle selectively movable between a use position and a non-use position, a non-use state detecting sensor (27) for detecting movement of the utility member to the non-use position, and an override unit (40) operable to override the automatic engine stop function of the automatic engine stop unit, the override unit providing an override signal to the automatic engine stop unit in response to detection by the non-use state detecting sensor of the movement of the utility member to the non-use position.

4 Claims, 11 Drawing Sheets

WORK VEHICLE HAVING OVERRIDABLE AUTOMATIC ENGINE STOP CIRCUIT

BACKGROUND OF THE INVENTION

1. Field of the Invention

The present invention relates to a work vehicle having an engine, a PTO shaft driven by power from the engine, an operator's seat, an operator's presence sensor for detecting presence/absence of an operator at the operator's seat, and an automatic engine stop unit for automatically stopping the engine in response to detection of absence of the operator at the operator's seat.

2. Description of the Related Art

Conventionally, with a work vehicle such as a tractor, a mowing machine, etc., when an operator leaves the operator's seat, a traveling of the vehicle body or driving of an implement connected to the PTO output shaft with the power from the engine is inhibited by the automatic engine stop unit operable to automatically stop the engine in response to detection of absence of the operator at the operator's seat (the operator's leaving the seat).

On the other hand, it is sometimes necessary for the work vehicle to carry out a stationary work such as an irrigating work or a wood chopping work by driving a pump for irrigation or a wood chopper connected to the PTO shaft with the power from the engine. For carrying out such stationary work not requiring traveling of the vehicle body, an operator needs to remain seated at the operator's seat in order to maintain the operator's presence sensor under its presence detecting state. This has been inconvenient. Addressing to this inconvenience, there is known from e.g. Japanese Patent Application "Kokai" No.: Hei. 01-155037 or U.S. Pat. No. 5,203,440, a system operable not to stop the engine under a certain predetermined transmission condition of the vehicle for allowing the engine to drive the PTO shaft under such condition. However, as such predetermined vehicle transmission condition varies according to the type of work to be effected, it has been difficult to specify a particular vehicle transmission condition which is relatively universally applicable to various situations.

SUMMARY OF THE INVENTION

A primary object of the present invention is to provide a technique which allows a stationary work to be carried out conveniently without impairing the automatic engine stop function provided for automatically stopping the engine in response to detection of absence of the operator's at the operator's seat.

For accomplishing the above-noted object, according to the present invention, in a work vehicle having an engine, a PTO shaft driven by power from the engine, an operator's seat, an operator's presence sensor for detecting presence/absence of an operator at the operator's seat, and an automatic engine stop unit operable to automatically stop the engine in response to detection of the operator's absence at the operator's seat, the work vehicle comprises:

a utility member for the vehicle selectively movable between a use position and a non-use position;

a non-use state detecting sensor for detecting movement of the utility member to the non-use position; and an override unit operable to override the automatic engine stop function of the automatic engine stop unit, the override unit providing an override signal to the automatic engine stop unit in response to detection by the non-use state detecting sensor of the movement of the utility member to the non-use position.

With the above-described construction, when no stationary work is to be effected, by not moving the utility member to its non-use position, the engine may be automatically stopped in association with absence of the operator at the operator's seat (i.e. the operator's leaving the operator's seat). On the other hand, when a stationary work is to be effected, by moving the utility member to its non-use position, the engine may be kept running in spite of the operator's absence at the operator's seat, so that an implement for the stationary work connected to the PTO shaft may be driven by the power from the engine.

That is to say, for effecting a stationary work which is uncommon in comparison with other operation modes of the vehicle such as traveling of the vehicle or a traveling work effected by an implement with traveling of the vehicle, the relatively simple operation of moving the utility member to its non-use condition which is not ordinarily used makes the operator positively aware of such work being to be effected and the inconvenience of keeping an operator remain seated at the operator's seat may be avoided as well. In addition, by not effecting this operation for enabling a stationary work, it is possible to avoid such inconvenience which might otherwise occur in the absence of the operator (i.e. the un-manned condition of the vehicle) as the vehicle being caused to run inadvertently by the power of the engine or the implement connected to the PTO shaft being driven by the engine power.

According to one preferred embodiment of the present invention, said utility member is provided in the vicinity of the operator's seat and the utility member, at its non-use position, prevents the operator from being seated at the operator's seat. With this construction, the operator is allowed to be seated at the operator's seat when the utility member is not moved to the non-use position and is prevented from being seated there when the utility member is moved to the non-use position. Hence, the operation of moving the utility member to the non-use position gives the operator clear awareness that a stationary work is to be initiated with the operator's being away from the seat, rather than a more ordinary vehicle traveling or traveling work which are effected with the operator being seated at the operator's seat.

According to another preferred embodiment of the present invention, said utility member comprises an armrest provided at the operator's seat and the armrest is pivotable to a reversed backward position as said non-use position thereof. With this construction, with the relatively simple operation for moving the armrest from the normal forward position to the reversed backward position as its non-use position, there is realized the switchover in condition of the vehicle from the vehicle traveling or traveling work to the condition enabling the stationary work. Further, this utility member provides the function as an armrest. In particular, if the position reversing switchover of the armrest between the normal position (use position) and the non-use position involves distinct two steps of pulling up the armrest and then pushing down the armrest, it becomes possible to effectively restrict occurrence of unconscious realization of the condition enabling the stationary work due to an accidental or erroneous operation (by an accidental contact or the like) of the armrest from the use (normal) position to the non-use position.

According to still another preferred embodiment of the present invention, said utility member comprises the operator's seat, the operator's seat being pivotable to a position inclined by a predetermined angle as said non-use position thereof, and a retainer member is provided for retaining the operator's seat at said non-use position. With this construction, with the relatively simple operation for moving the operator's seat from its normal (use) position to the non-use position inclined by a predetermined angle, there is realized the switchover in condition of the vehicle from the vehicle traveling or traveling work to the condition enabling the stationary work and also the operator is prevented from being seated at the operator's seat. Further, with the simple operations of releasing the retention of the operator's seat by the retainer member and then moving the seat from the non-use position to the normal position, there is realized the reverse switchover in the condition of the vehicle from the condition for the stationary work to the normal traveling or traveling work and the operator is allowed to be seated. Further, since the switchover to the non-use position of the operator's seat involves two distinct operations of pivoting the operator's seat and then retaining the seat by the retainer member, it becomes possible to effectively restrict occurrence of unconscious realization of the condition enabling the stationary work due to an accidental or erroneous operation (by an accidental contact or the like) of the operator's seat from the use (normal) position to the non-use position.

According to still another preferred embodiment of the present invention, said utility member comprises the operator's seat, the operator's seat being movable into a turned-over position as said non-use condition thereof. With this construction, with the relatively simple operation for moving the operator's seat from its normal (use) position to the non-use position, there is realized the switchover in condition of the vehicle from the vehicle traveling or traveling work to the condition enabling the stationary work, and the operator is prevented from being seated at the operator's seat. And, with the relatively simple operation for moving the operator's seat from the non-use position to the normal (use) position, there is realized the reverse switchover in the condition of the vehicle from the condition enabling the stationary work to the vehicle traveling or traveling work condition. Further, since this non-use position is the turned-over position of the operator's seat, it becomes possible to effectively restrict occurrence of unconscious realization of the condition enabling the stationary work due to an accidental or erroneous operation (by an accidental contact or the like) of the operator's seat from the use (normal) position to the non-use position. Furthermore, even if such inconvenience should occur, the operator may easily recognize this. Hence, it becomes possible to restrict even more effectively occurrence of unconscious realization of the condition enabling a stationary work.

According to still another preferred embodiment of the present invention, said utility member comprises the operator's seat and the operator's seat is slidable in the fore-and-aft direction to a position near a steering wheel of the vehicle, as said non-use position thereof. In this case, with the simple operation of moving the operator's seat from its normal position distant from the steering wheel to the non-use position near the steering wheel, there is realized the switchover in condition of the vehicle from the vehicle traveling or traveling work to the condition enabling the stationary work and also the operator is prevented from being seated at the operator's seat. Further, with the simple reverse operation for moving the operator's seat from the non-use position to the normal position, there is realized the reverse switchover in the condition of the vehicle from the condition enabling the stationary work to the normal traveling or traveling work and the operator is allowed to be seated. Moreover, needless to say, the mechanism allowing these back and forth sliding adjustment movements of the operator's seat inherently includes a lock mechanism for locking the operator's seat at its normal (use) position. With this, it becomes possible to effectively restrict occurrence of unconscious realization of the condition enabling the stationary work due to an accidental or erroneous operation (by an accidental contact or the like) of the operator's seat from the use (normal) position to the non-use position. Namely, with simple and minor modification of the standard construction of the operator's seat, it is possible to make the operator's seat slidable in the fore-and-aft direction to the non-use position near the steering wheel. Accordingly, while effectively restricting occurrence of unconscious realization of the condition enabling the stationary work due to an accidental or erroneous operation (by an accidental contact or the like) of the operator's seat from the use (normal) position to the non-use position, the condition enabling a stationary work may be easily realized without the inconvenience of keeping an operator or someone else remain seated at the operator's seat.

According to still another preferred embodiment of the present invention, said utility member comprises a seat back of the operator's seat and the seat back is pivotable to a laid-over position as said non-use position. In this case, with the simple operation of moving the seat back from its normal erect position to the non-use laid-over position, there is realized the switchover in condition of the vehicle from the vehicle traveling or traveling work to the condition enabling the stationary work and also the operator is prevented from being seated at the operator's seat. Conversely, with the simple operation for erecting the seat back from its non-use position to its use (normal) position, there is realized the reverse switchover in the condition of the vehicle from the condition for the stationary work to the normal traveling or traveling work and the operator is allowed to be seated.

According to still another preferred embodiment of the present invention, said utility member comprises a seat cushion of the operator's seat and the seat cushion is pivotable to an erect position as said non-use position. In this case, with the simple operation of moving the seat cushion from its normal laid-over position to the non-use erect position, there is realized the switchover in condition of the vehicle from the vehicle traveling or traveling work to the condition enabling the stationary work and also the operator is prevented from being seated at the operator's seat.

According to a still another preferred embodiment of the present invention, said utility member comprises the steering wheel and the steering wheel is movable to a position near the operator's seat as said non-use position In this case, with the simple operation of downwardly moving the steering wheel from its normal (use) position distant from the operator's seat to its non-use position near the operator's seat, there is realized the switchover in condition of the vehicle from the vehicle traveling or traveling work to the condition enabling the stationary work and the operator is prevented from being seated at the operator's seat as well. Conversely, with the simple operation of upwardly moving the steering wheel from the non-use position to the normal (use) position, there is realized the reverse switchover in the condition of the vehicle from the the condition enabling the stationary work to the normal traveling or traveling work and the operator is allowed to be seated.

In case the utility member comprises the operator's seat, the operator's presence sensor can act also as the non-use state detecting sensor.

According to still another preferred embodiment of the present invention, if it is detected that the vehicle is traveling when the non-use state detecting sensor detects the movement of the utility member to the non-use position, the automatic engine stop unit forcibly stops the engine in spite of the presence of the override signal. With this construction, if the vehicle is rendered erroneously into the traveling condition due to e.g. an erroneous operation on a change-speed controller while the stationary work is enabled by setting the utility member at its non-use position, the engine is stopped automatically to prevent the vehicle body from traveling. Accordingly, this construction can prevent occurrence of inadvertent vehicle run while the stationary work is made possible.

Further and other features and advantages of the invention will become apparent from the following detailed description of preferred embodiments thereof with reference to the accompanying drawings.

DESCRIPTION OF THE PREFERRED EMBODIMENTS

Figure 1:
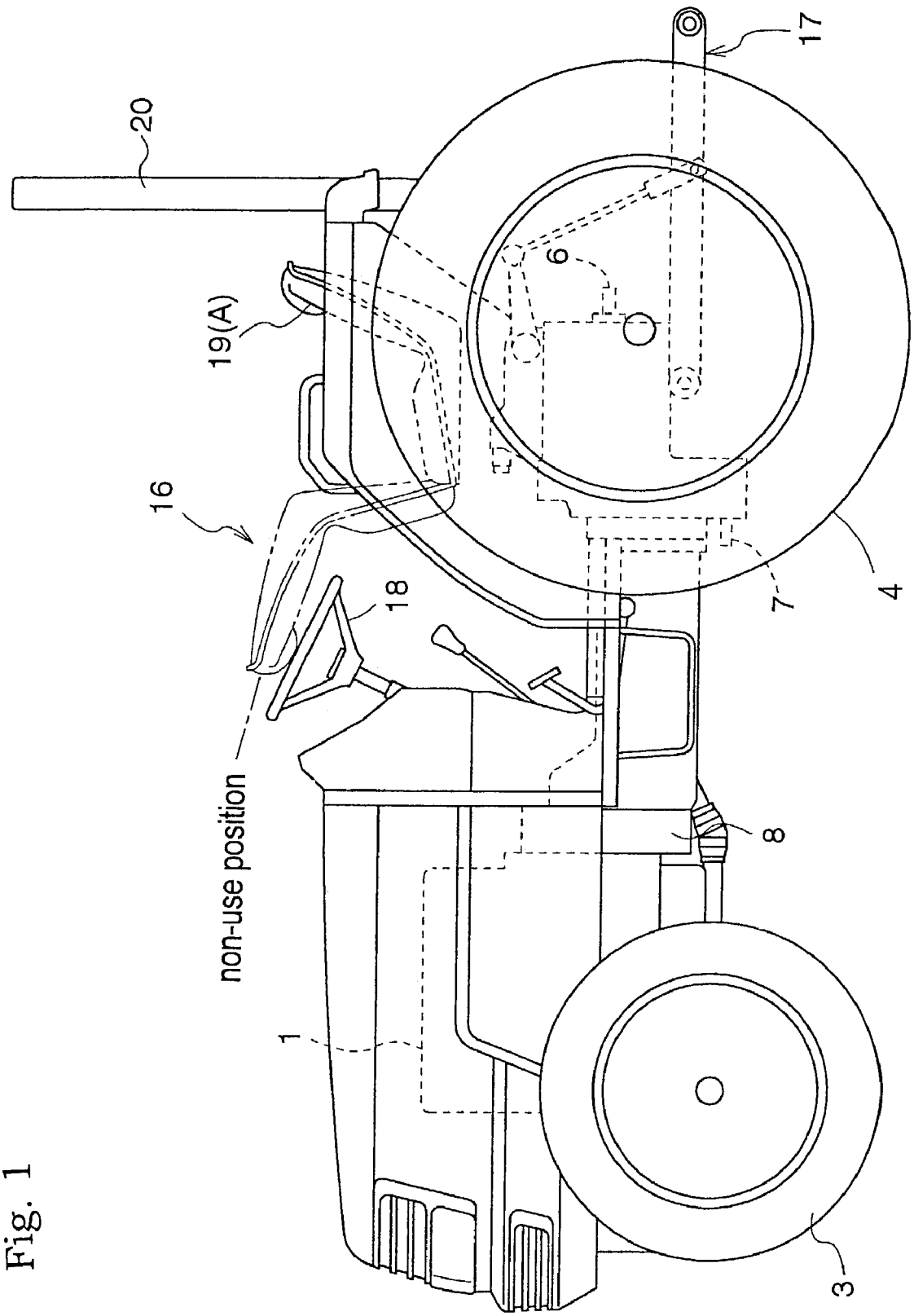
FIG. 1 is an overall side view showing a tractor as an example of a work vehicle relating to the present invention.
Figure 2:
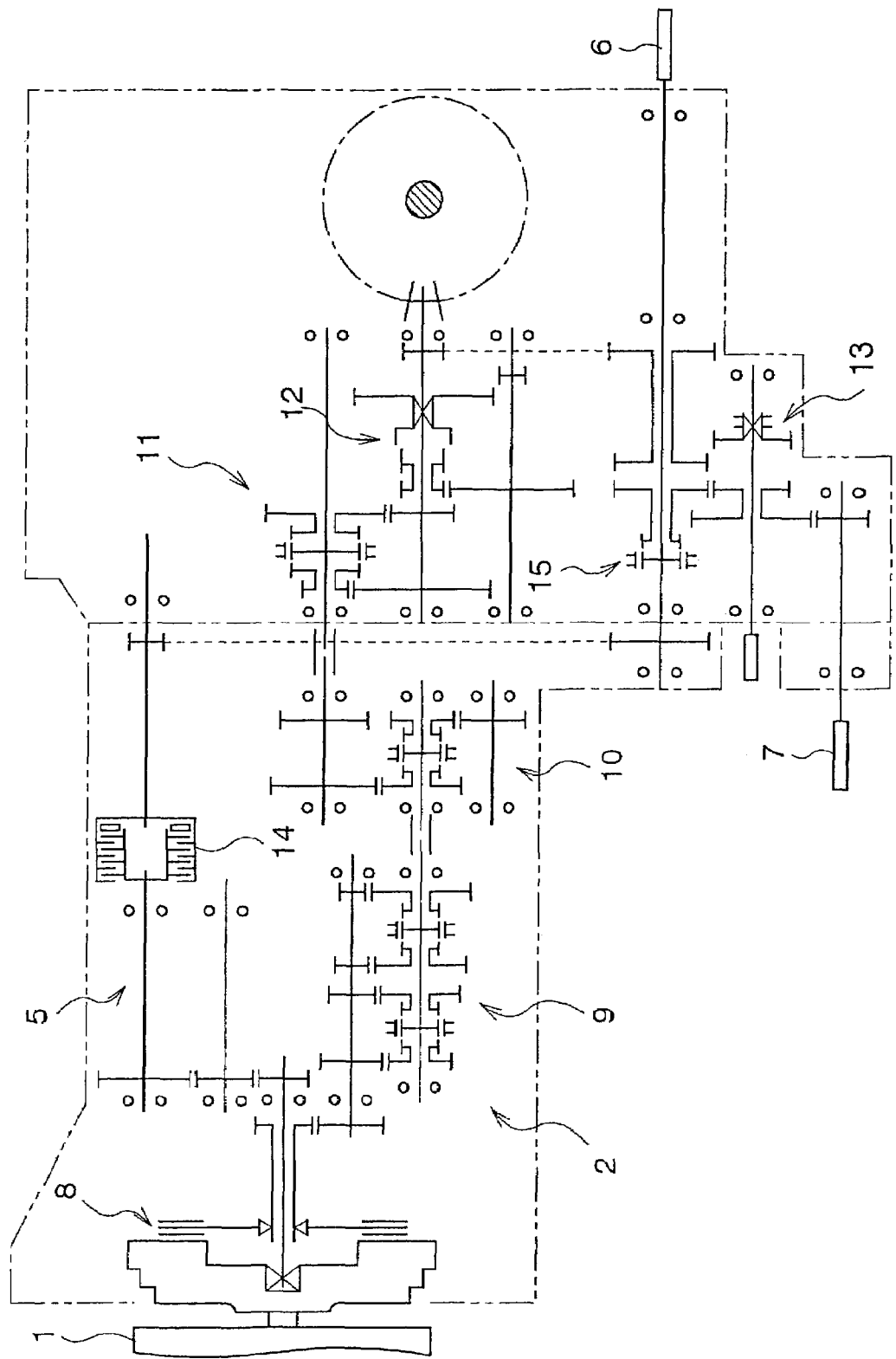
FIG. 2 is a schematic diagram of a transmission system.

FIG. 1 is an overall side view of a tractor as an example of a work vehicle. FIG. 2 shows a transmission system of this tractor. With this tractor 1, power from an engine 1 mounted at the front portion of the tractor can be transmitted via a traveling transmission line 2 to a pair of right and left front wheels 3 and a pair of right and left rear wheels 4. Further, the engine power can be transmitted also via a PTO transmission line 5 to a rear PTO shaft 6 and to an intermediate PTO shaft 7.

The traveling transmission line 2 includes, as major components thereof, a traveling clutch 8 for transmitting or non-transmitting the power from the engine 1, a main change-speed unit 9 for changing the power transmitted via the traveling clutch 8 into four speeds, a forward/reverse switchover unit 10 for selectively providing a condition for allowing the power after its change-speed operation by the main change-speed device 9 to be transmitted as a forward traveling power and a further condition for allowing this power to be transmitted as a reverse traveling power, an auxiliary change-speed unit 11 for changing the power after its switchover by the forward/reverse switchover unit 10 into two speeds of high and low, a fine change-speed unit 12 for switching over the power after its change-speed operation by the auxiliary change-speed unit 10 between a reduced state and a non-reduced state, and a front-wheel clutch 13 for transmitting or non-transmitting the power from the fine change-speed unit 13 to the right and left front wheels 3.

The PTO transmission line 5 includes, as major components thereof, a PTO clutch 14 for transmitting or non-transmitting the power from the engine 1, and an auxiliary PTO clutch 15 for transmitting or non-transmitting the power to the intermediate PTO shaft 7, thereby to selectively realize a work mode in which the rear PTO shaft 6 alone is driven and a further work mode in which both the rear PTO shaft 6 and the intermediate PTO shaft 7 are driven.

As shown in FIG. 1, this tractor mounts, at the rear portion thereof, an operator's station 16 and a link mechanism 17 for connecting an implement, with the link mechanism 17 being driven to be lifted up and down. At the operator's station 16, there are provided such components as a steering wheel 18 operably linked with the right and left front wheels 1 and an operator's seat 19 as a utility member A disposed between the right and left rear wheels 2. And, rearwardly of the operator's seat 19, there is provided erect a ROPS (roll over protection system) frame 20.

Figure 3:
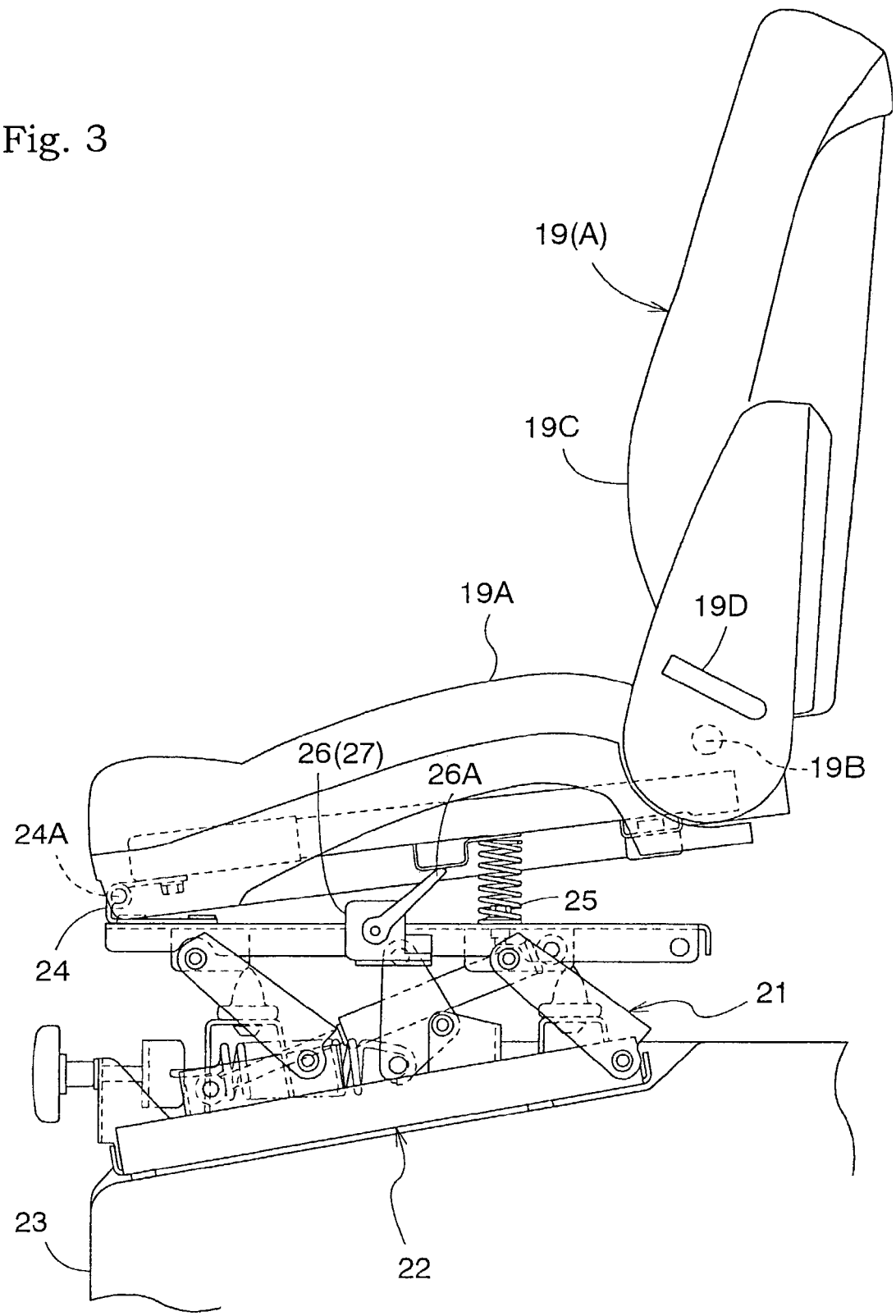
FIG. 3 is a side view showing principal portions of a construction including an operator's seat.
Figure 4:
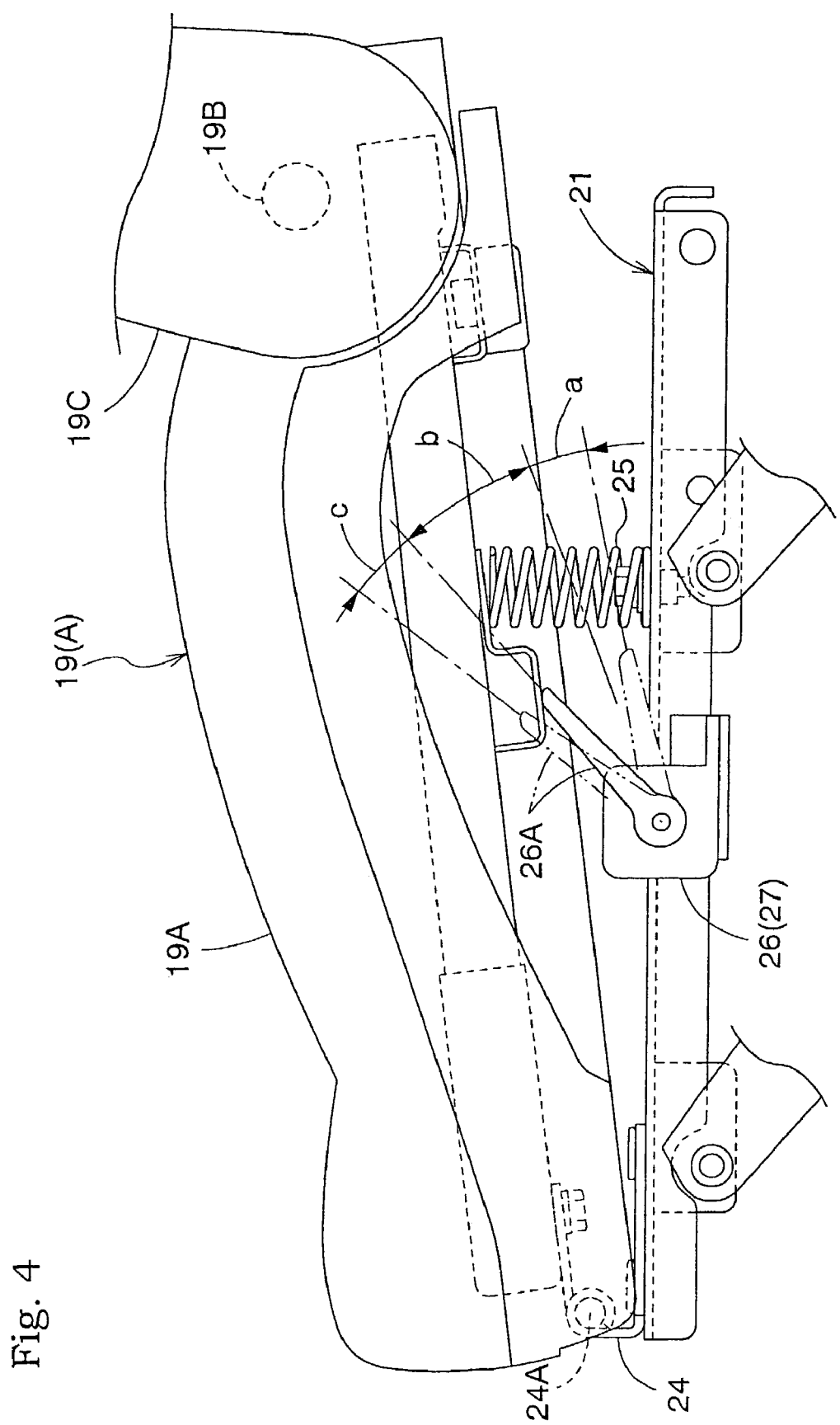
FIG. 4 is a side view showing principal portions illustrating a condition when an operator's presence sensor detects absence of the operator (the operator's leaving the seat)
Figure 5:
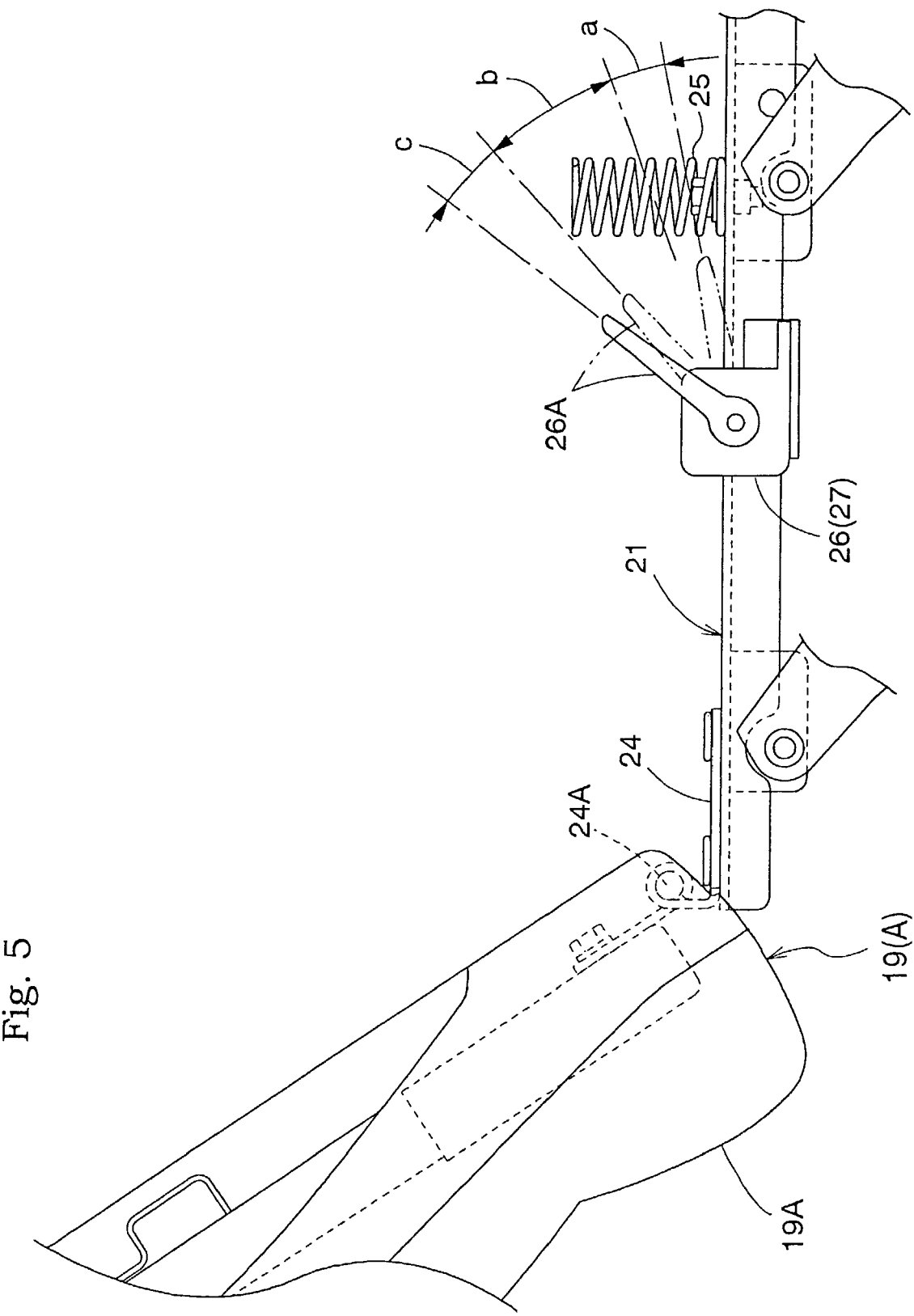
FIG. 5 is a side view showing principal portions illustrating a condition when an operator's presence sensor does not detect absence of the operator.

As shown in FIGS. 3 through 5, the operator's seat 19 includes, e.g. a seat cushion 19A supported on a seat support 23 via a suspension mechanism 21 and an fore-and-aft adjustment mechanism 22 and a seat back 19C connected to the rear end of the seat cushion 19A to be pivotable in a fore and aft direction about a support shaft 19B oriented along the right-and-left direction. The front end of the seat cushion 19A is connected via a hinge 24 to the suspension mechanism 21, so that the seat cushion is pivotable about the support shaft 19B oriented along the right-and-left direction. The suspension mechanism 21 includes a spring 25 for urging the operator's seat 19 to be pivoted upwardly from a seated position to a non-seated position in response to the operator's leaving the operator's seat 19 and an operator's presence sensor 26 for detecting presence and absence of the operator at the operator's seat 19 in association with the action of the spring 25.

The operator's presence sensor 26 comprises a two-contact switch having a presence-detecting area (a) for detecting displacement of the operator's seat 19 to the seated position, an absence-detecting area (b) for detecting displacement of the operator's seat 19 to the non-seated position, and also a non-use state detecting area (c) for detecting a turnover of the operator's seat 19 into a non-use position which is not normally used. And, a detecting element 26A therefor is pivotally urged upwards from the presence-detecting area (a) toward the non-use state detecting area (c). That is to say, this operator's presence sensor 26 is used also as a "non-use state detecting sensor" 27 for detecting movement of the operator's seat 19 to its non-use condition. This is advantageous for simplicity and cost reduction of the construction, in comparison with a case where a dedicated non-use state detecting sensor is provided for sole purpose of the detection of movement of the operator's seat 19 to the non-use position.

A reference mark 19D shown in FIG. 3 denotes a manipulator for releasing a lock mechanism provided in the operator's seat 19 in order to allow fixed retention of the seat back 19C under a desired posture.

Figure 6:
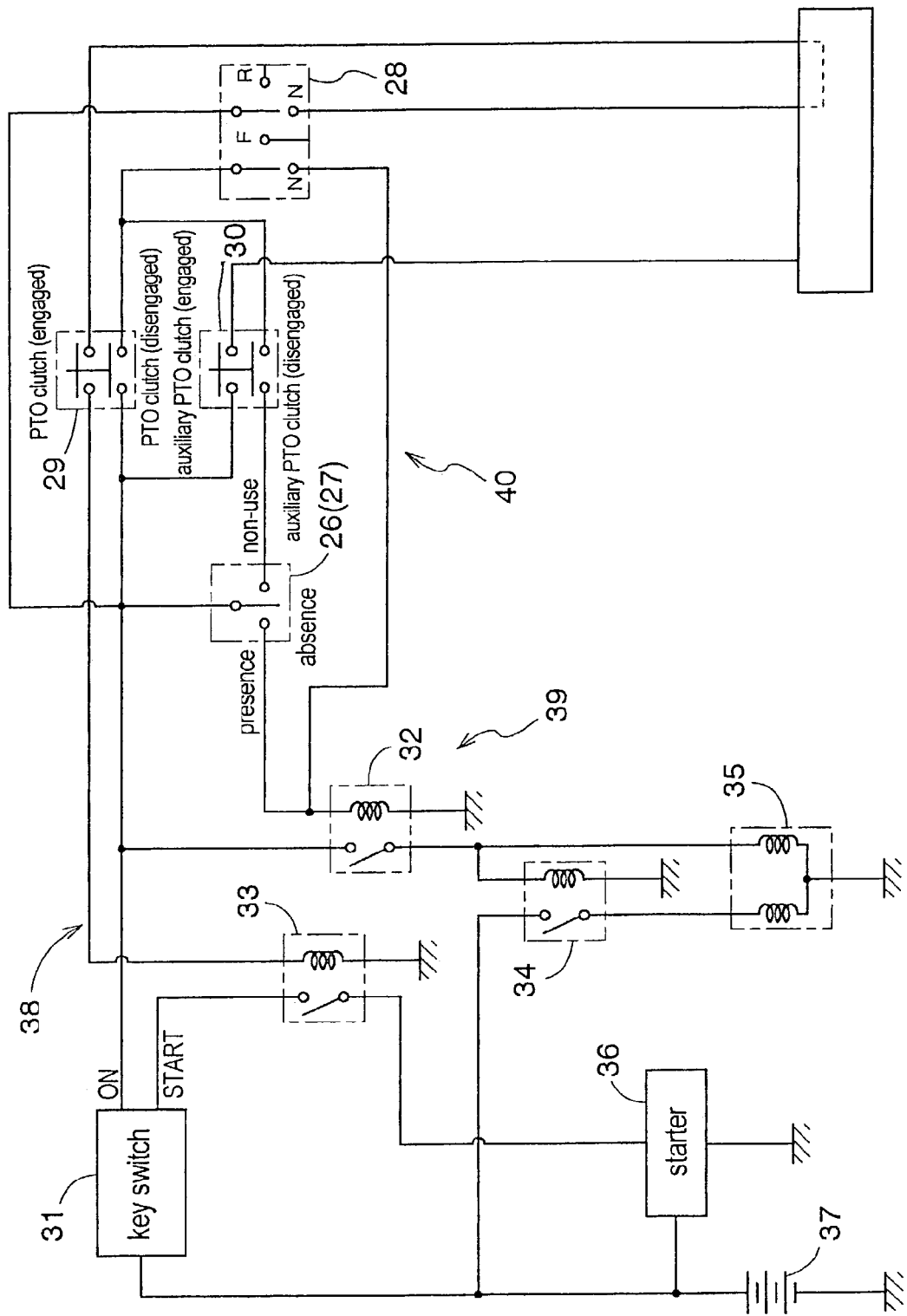
FIG. 6 is an electric circuit diagram showing constructions of an automatic engine stop circuit and an automatic engine stop override circuit.

As shown in FIG. 6, in addition to the operator's presence sensor 26 described above, this tractor also includes a traveling sensor 28 for detecting whether the forward/reverse switchover unit 10 is under its neutral state or not, a first PTO sensor 29 for detecting the PTO clutch 14 is at its disengaged state or not, and a second PTO sensor 30 for detecting whether the auxiliary PTO clutch 15 is at its disengaged state or not. The operator's presence sensor 26 is operable to shorts an ON position of a key switch 31 to a sensor relay 32 when the operator's presence is detected, and to short the ON position of the key switch 31 to the second PTO sensor 30 when the non-use state is detected, and further operable to release these shorts when the operator's absence is detected.

The traveling sensor 28 comprises an ON/OFF switch operable to short the first PTO sensor 29 and the second PTO sensor 30 to the sensor relay 32 and short the ON position of the key switch 31 to the first PTO sensor 29 when the neutral state of the forward/reverse switchover unit 10 is detected, and operable also to release these shorts when the neutral state of the forward/reverse switchover unit 10 is not detected. The first PTO sensor 29 comprises an ON/OFF switch operable to short the ON position of the key switch 31 to the traveling sensor 28 and shorts the traveling sensor 28 to a starter relay 33 when the disengaged state of the PTO clutch 14 is detected and operable also to release these shorts when the engaged state of the PTO clutch 14 is detected. The second PTO sensor 30 comprises an ON/OFF switch operable to short the operator's presence sensor 26 to the traveling sensor 28 when the disengaged state of the auxiliary PTO clutch 15 is detected and operable also to release this short when the engaged state of the auxiliary PTO clutch 15 is detected.

The sensor relay 32 is operable, under its excited state, to short the ON position of the key switch 31 to an engine stop relay 34 and an engine stop solenoid 35 and operable, under its non-excited state, to release these shorts. The starter relay 33 is operable, under its excited state, to short the start position of the starter switch 31 to the starter 36 and operable also, under its non-excited state, to release this short. The engine stop solenoid 35 is operable, under its non-energized state, to allow fuel supply to the engine 1 and operable also under its non-energized state, to prevent fuel supply to the engine 1. The starter 36, when energized, starts the engine 1.

That is to say, this tractor includes an engine start preventing circuit 38 operable to allow start of the engine 1 by allowing power supply from a battery 37 to the engine stop solenoid 35 and the starter 36 in response to an operation of the key switch 31 when the neutral state of the forward/reverse switchover unit 10 and the disengaged state of the PTO clutch 14 are realized, the automatic engine stop circuit 39 acting as an automatic engine stop unit operable to automatically stop the engine 1 by preventing the power supply from the battery 37 to the engine stop solenoid 35 in association of detection of the operator's absence by the operator's presence sensor 26 during the traveling of the vehicle or when the rear PTO shaft 6 or the intermediate PTO shaft 7 is driven, and an override circuit 40 acting as an override unit operable to prevent the automatic engine stop function of the automatic engine stop circuit 39 in association with an operator's operation for turning over the operator's seat 19 into its non-use condition when the operator leaves the operator's seat 19, by allowing the power supply from the battery 37 to the engine stop solenoid 35.

With the above-described construction, when a stationary work such as an irrigating work or a wood chopping work is to be carried out, with the relatively simple operation of just turning over the operator's seat 19 into the non-use position, the engine 1 may be operated in spite of the operator's leaving (absence from) the operator's seat 19, without the inconvenience of keeping the operator or someone else remain seated at the operator's seat 19, so that the rear PTO shaft 6 can be driven by the power from the engine 1. As a result, an un-manned stationary work such as the irrigating work or wood chopping work is made possible by connecting, to this rear PTO shaft 6, such implements for stationary works as irrigating pump or the wood chopper, etc. (not shown). Thereafter, when traveling of the vehicle or a traveling work, i.e. work with traveling of the vehicle, becomes necessary, then, with a relatively simple reverse operation of returning the operator's seat 19 to the normal use position, i.e. either the non-seated position or seated position, the engine 1 will be automatically stopped. As a result, it is possible to prevent such inconvenience of the vehicle getting started with the power from the engine 1 or the unillustrated implement connected to the rear PTO shaft 6 or to the intermediate PTO shaft 7 being activated with the engine power, under the un-manned condition when the operator is away from the operator's seat 19.

Further, the operation for enabling the stationary work is the operation not normally effected during the traveling of the vehicle or the traveling work, i.e. the operation for turning over the operator's seat 19 into the non-use position which is not normally used. Hence, this can give the operator positive awareness that a stationary work is to be initiated. Also, an erroneous operation due to accidental contact by the operator or the like may be avoided. Therefore, it has become possible to effectively restrict occurrence of unconscious realization of the condition enabling a stationary work.

Moreover, since the operator's presence sensor 26 has the presence-detecting area (a), the absence-detecting area (b) and the non-use state detecting area (c). Hence, regardless of presence of a certain amount of assembly error, this sensor will still be capable of reliably detecting the operator's seating to the operator's seat 19 or leaving the seat 19 as well as the movement of the operator's seat 19 to the non-use position thereof. Also, this construction is effective for preventing inadvertent automatic stop of the engine 1 by activation of the automatic engine stop circuit 39, due to slight displacement of the operator's seat 19 which may occur due to a bouncing of the vehicle body during its traveling or traveling work or the operator's changing his/her seated position on the operator's seat 19. In these ways, this construction is advantageous for assembly and maneuverability of the vehicle as well.

Furthermore, when the forward or reverse drive state of the forward/reverse switchover unit 10 or the engaged state of the auxiliary PTO clutch 15 is realized during the stationary work, the override circuit 40 is operable to prevent the power supply from the battery 37 to the engine stop solenoid 35, thereby to stop the engine 1 automatically. As a result, such inconveniences as inadvertent run or start of the vehicle due to an erroneous operation on the forward/reverse switchover unit 10 or the auxiliary PTO clutch 17 during the stationary work with the rear PTO shaft 6 being driven or the inadvertent activation of the implement such as an unillustrated mower connected to the intermediate PTO shaft 7 with driving of this intermediate PTO shaft 7 may be avoided advantageously.

[Other Embodiments]

Next, other embodiments of the invention will be described.

[1] The work vehicle may be a passenger driven mowing machine or a rice planting machine, etc.

Figure 7:
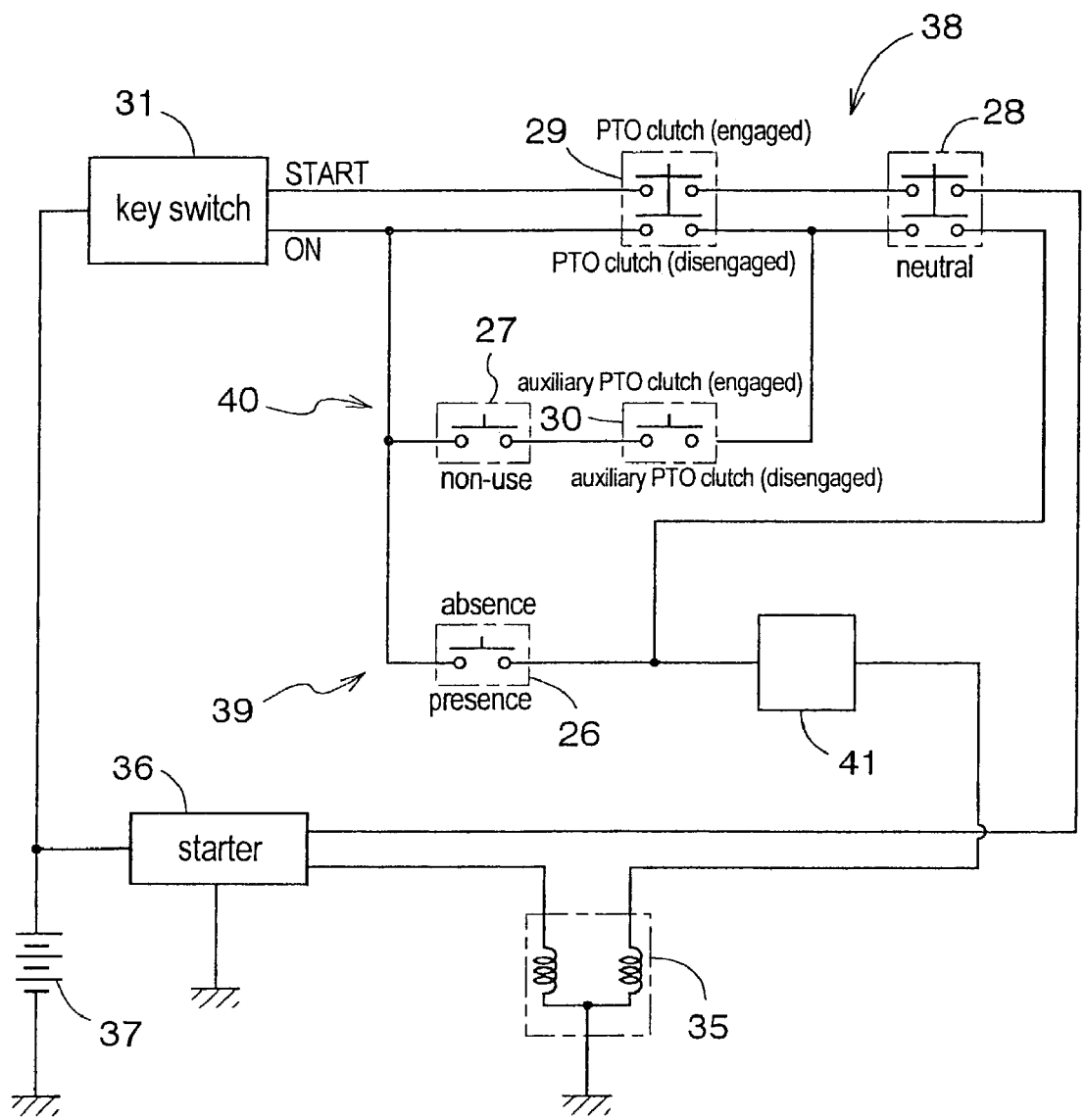
FIG. 7 is an electric circuit diagram showing a further embodiment in which a dedicated non-use state detecting sensor is provided.

[2] FIG. 7 shows a construction of a further embodiment. In this case, the operator's presence sensor 26 comprises an ON/OFF switch operable to short the ON position of the key switch 31 to a stop delay circuit 41 when the operator's presence is detected and operable also to release this short when the operator's absence (leaving the seat) is detected. Also, a dedicated non-use state detecting sensor 27 is provided for detecting the movement of the operator's seat 19 to its non-use position and this sensor 27 is operable to short the ON position of the key switch 31 to the second PTO sensor 30 when the non-use state of the seat 19 at its non-use position is detected and operable also to release this short when the non-use state is not detected. With these, there are provided the automatic engine stop circuit 39 acting as the automatic engine stop unit for automatically stopping the engine 1 by preventing the power supply from the battery 37 to the engine stop solenoid 35 in response to detection of the operator's leaving the operator's seat 26 and the override circuit 40 for preventing this automatic engine stop function of the automatic engine stop circuit 39 when the neutral state of the forward/reverse switchover unit 10 and the disengaged state of the auxiliary PTO clutch 15 realized, in response to the operator's leaving the operator's seat 19, by allowing the power supply from the battery 37 to the engine stop solenoid 35 in response to the operator's operation of turning over the operator's eat 19 when leaving this seat 19.

In the case of this construction, thanks to the stop delay circuit 41, it becomes possible to avoid the inconvenience of inadvertent stop of the engine 1 by the activation of the automatic engine stop circuit 39 based on detection of short absence (e.g. for 5 seconds) of the operator by the operator's presence sensor 26, due to bouncing of the vehicle body during traveling or traveling work or the operator's changing his/her seated position on the operator's seat 19.

Figure 8:
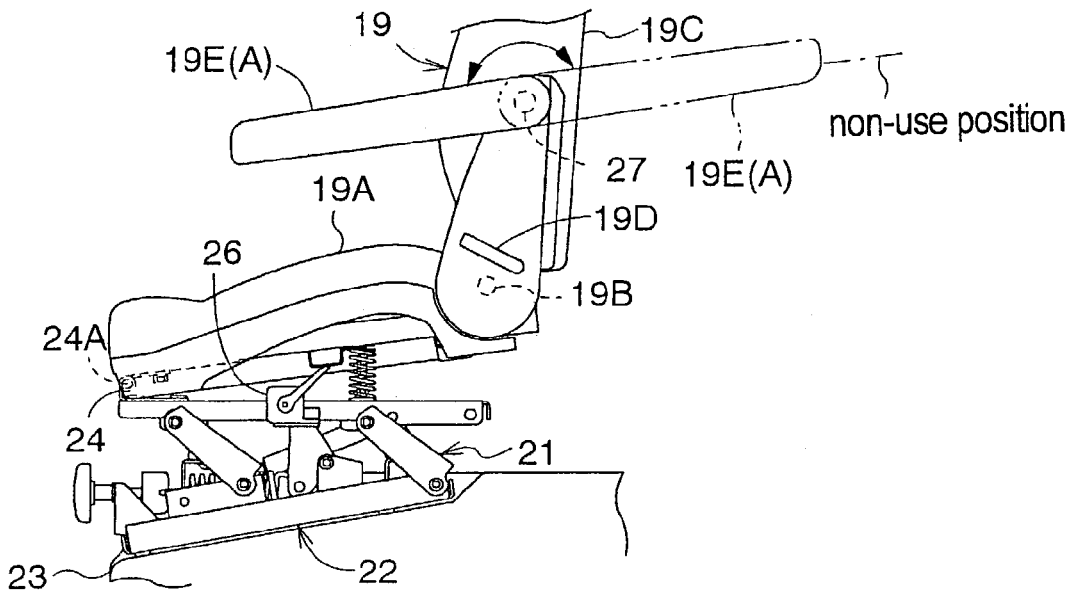
FIG. 8 is a side view showing principal portions of a further embodiment in which the utility member comprises an armrest.

[3] FIG. 8 shows a construction of a still further construction. In this case, the utility member A comprises one or both of armrests 19E disposed on the right and left sides of the operator's seat 19. And, this or each armrest 19E is pivotable into a backward reversed position as its non-use position. And, the non-use state detecting sensor 27 is operable to detect movement of the armrest 19E to this non-use position. And, in response to detection of the non-use by the non-use state detecting sensor 27, the automatic engine stop function of the automatic engine stop unit 39 in response to the operator's leaving the operator's seat 19 is prevented.

Alternatively, though not shown, it is also possible to render the armrest 19E pivotable in the right and left direction into a non-use position in front of the seat back 19C for preventing the operator from being seated at the operator's seat 19. And, the non-use state detecting sensor 27 is operable to detect movement of the armrest 19E to this non-use position. And, in response to detection of the non-use by the non-use state detecting sensor 27, the automatic engine stop function of the automatic engine stop unit 39 in response to the operator's leaving the operator's seat 19 is prevented.

Figure 9:
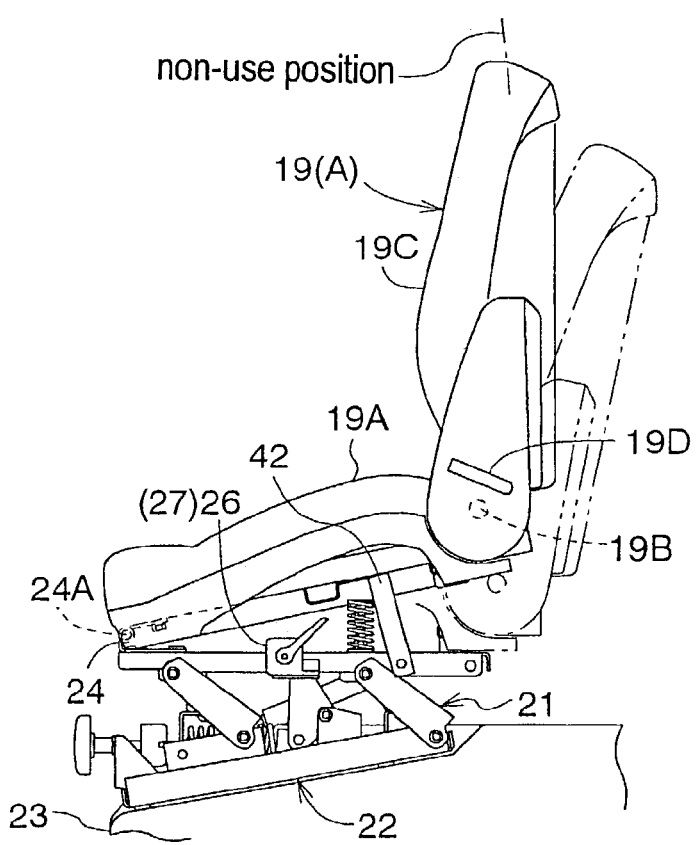
FIG. 9 is a side view showing principal portions of a further embodiment in which a forwardly inclined position of an operator's seat is used as the non-use position.

[4] FIG. 9 shows a construction of a still another embodiment. In this case, the non-use position comprises a position of the operator' seat 19 forwardly inclined by a predetermined angle. And, a retainer member 42 is provided for retaining the operator' seat 19 at this position inclined by the predetermined angle, thereby to prevent the operator from being seated at the operator's eat 19. And, the non-use state detecting sensor 27 is operable to detect movement of the operator's seat 19 to this non-use position. And, in response to detection of the non-use by the non-use state detecting sensor 27, the automatic engine stop function of the automatic engine stop unit 39 in response to the operator's leaving the operator's seat 19 is prevented.

Figure 10:
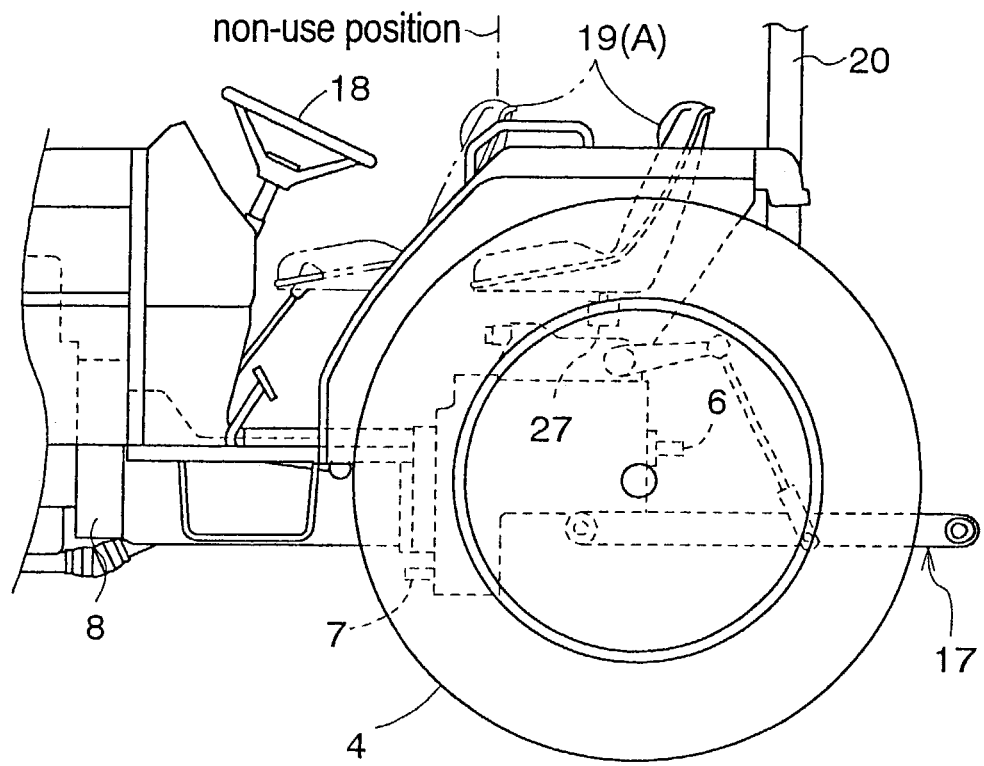
FIG. 10 is a side view showing principal portions of a further embodiment in which a position of the operator's seat near a steering wheel is used as the non-use position.

[5] FIG. 10 shows a construction of a still another embodiment. In this case, the fore-and-aft adjusting mechanism 22 allows movement of the operator's seat 19 closer to the steering wheel 18. Then, this position of the operator's seat 19 near the steering wheel 18 is used as the non-use position to be detected by the non-use detecting sensor 27. And, in response to detection of the non-use state by the non-use state detecting sensor 27, the automatic engine stop function of the automatic engine stop unit 39 in response to the operator's leaving the operator's seat 19 is prevented.

Figure 11:
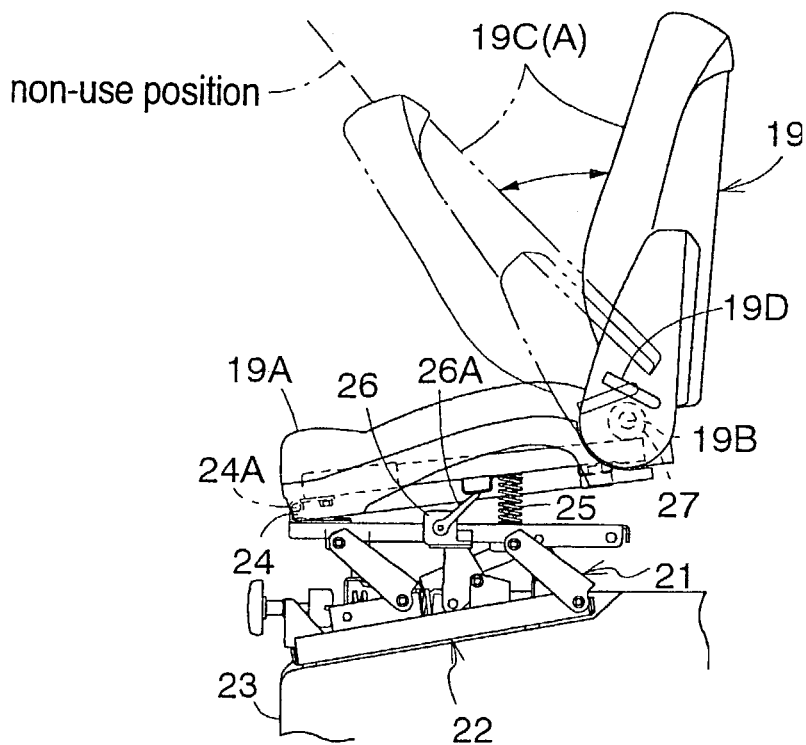
FIG. 11 is a side view showing principal portions of a further embodiment in which the utility member comprises a seat back.

[6] FIG. 11 shows a construction of a still further embodiment. In this embodiment, the utility member A comprises the seat back 19C of the operator's seat 19. And, the non-use position comprises a position of the seat back 19C forwardly inclined to prevent the operator from being seated at the operator's seat 19. This non-use position is detected by the non-use detecting sensor 27. And, in response to detection of the non-use by the non-use state detecting sensor 27, the automatic engine stop function of the automatic engine stop unit 39 in response to the operator's leaving the operator's seat 19 is prevented.

Figure 12:
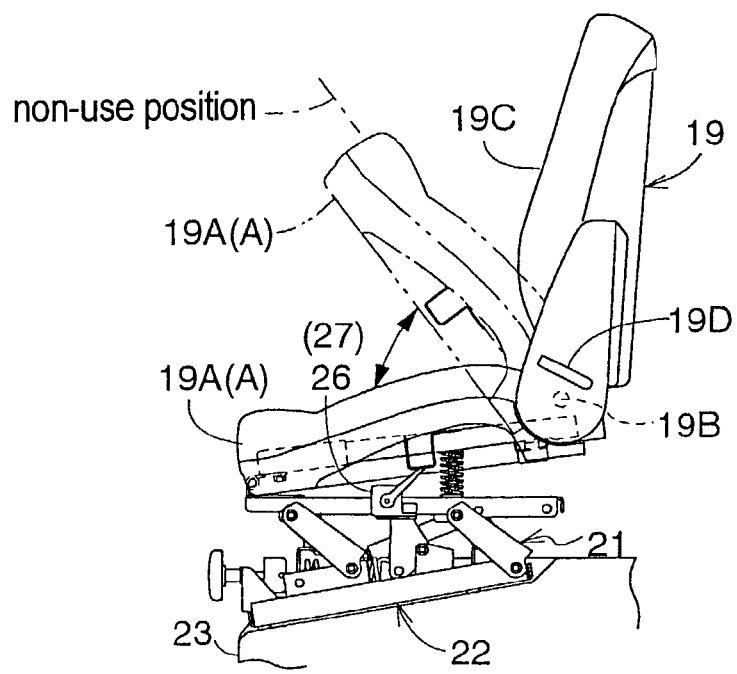
FIG. 12 is a side view showing principal portions of a further embodiment in which the utility member comprises a seat cushion.

[7] FIG. 12 shows a construction of a still further embodiment. In this embodiment, the utility member A comprises the seat cushion 19A of the operator's seat 19. The seat cushion 19A is pivotable (erected) up and down. And, the non-use position comprises a position of the seat cushion 19A erected to prevent the operator from being seated at the operator's seat 19. This non-use position is detected by the non-use detecting sensor 27. And, in response to detection of the non-use by the non-use state detecting sensor 27, the automatic engine stop function of the automatic engine stop unit 39 in response to the operator's leaving the operator's seat 19 is prevented.

Figure 13:
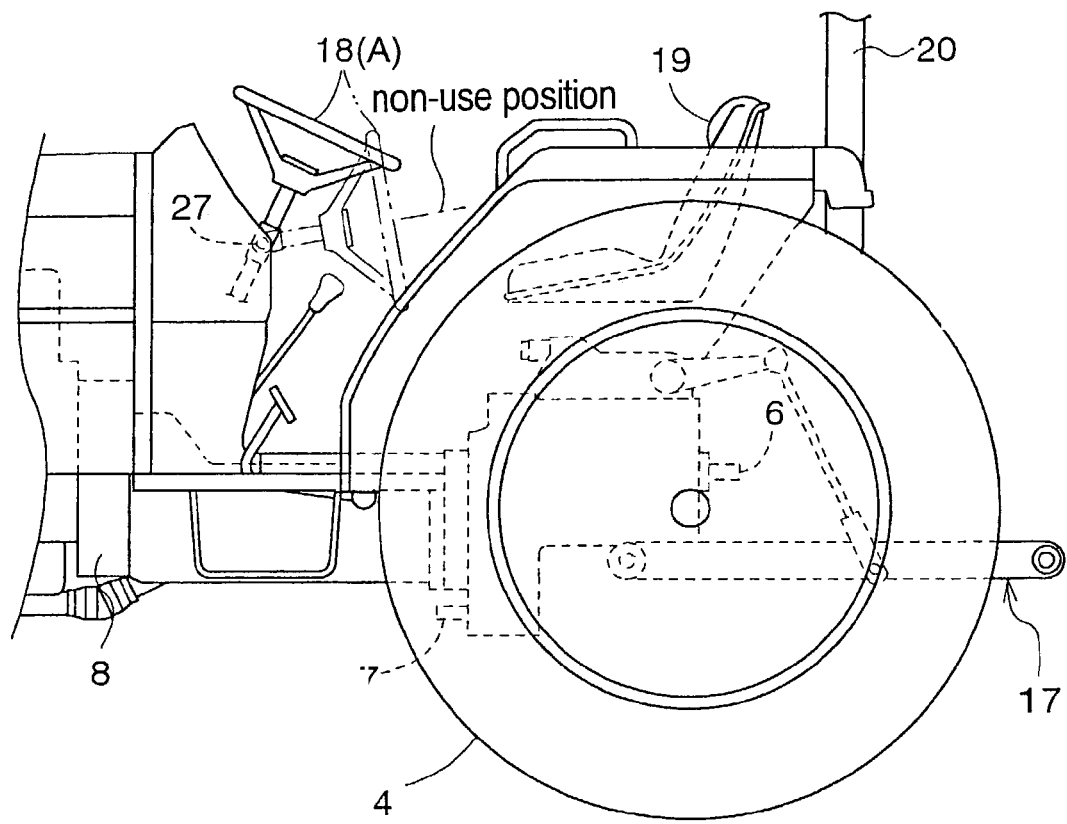
FIG. 13 is a side view showing principal portions of a further embodiment in which the utility member comprises a steering wheel.

[8] FIG. 13 shows a construction of a still further embodiment. In this embodiment, the utility member A comprises the steering wheel 18. And, the steering wheel 18 is adapted to be vertically displaceable. And, a position of this steering wheel 18 closer to the operator's seat 18 is used as the non-use position to be detected by the non-use detecting sensor 27. And, in response to detection of the non-use by the non-use state detecting sensor 27, the automatic engine stop function of the automatic engine stop unit 39 in response to the operator's leaving the operator's seat 19 is prevented.

Figure 14:
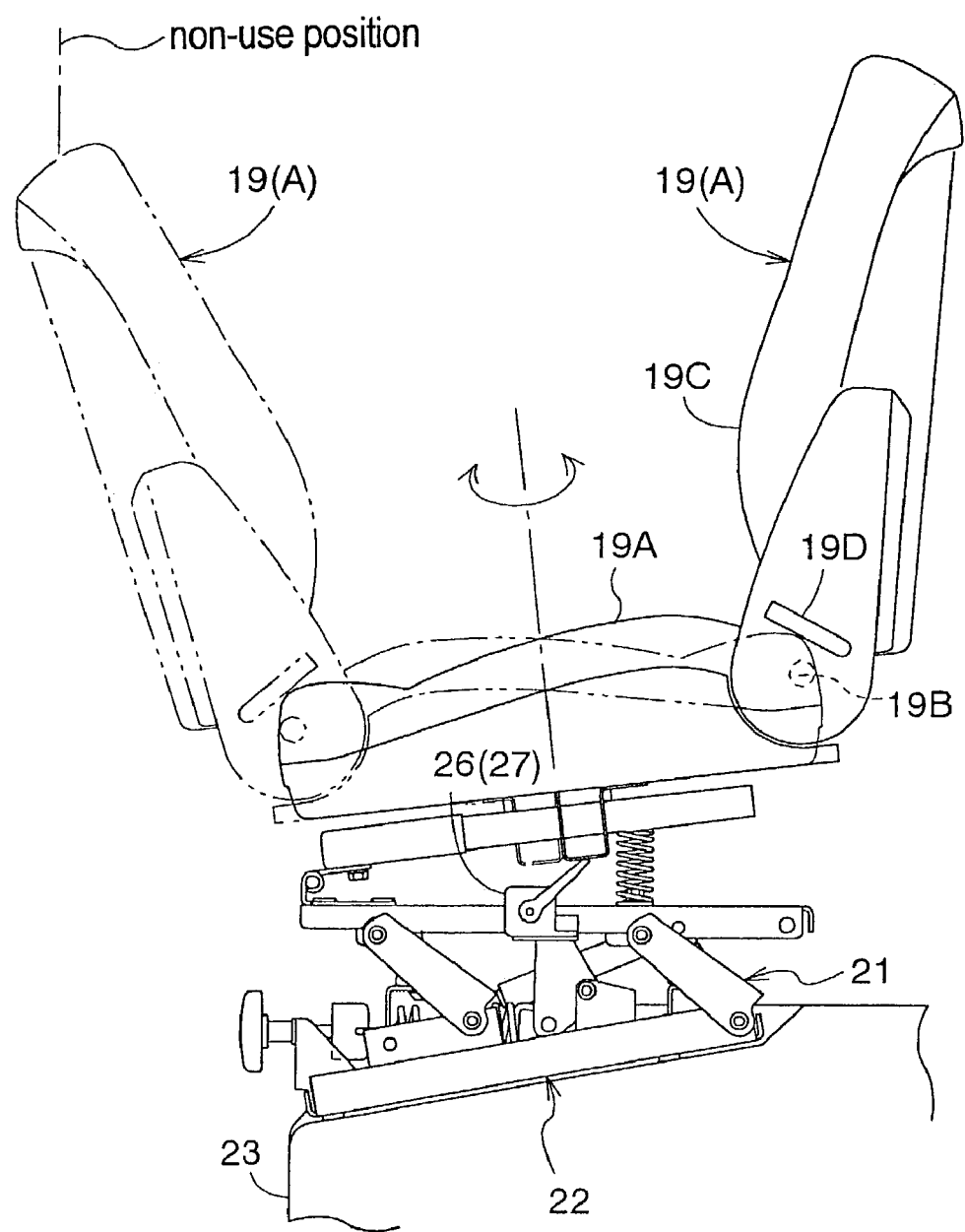
FIG. 14 is a side view showing principal portions of a further embodiment in which a backward reversed position of the operator's seat is used as the non-use position.

[9] FIG. 14 shows a construction of a still further embodiment. In this embodiment, the operator's seat 19 is adapted to be swivellable. And, backward reversed position of the operator's seat is used as the non-use position to be detected by the non-use detecting sensor 27. And, in response to detection of the non-use by the non-use state detecting sensor 27, the automatic engine stop function of the automatic engine stop unit 39 in response to the operator's leaving the operator's seat 19 is prevented.

[10] The override circuit 40 may be adapted for automatically overriding the automatic engine stop function of of the automatic engine stop unit 39 in response to the operator's leaving the operator's seat 19, regardless of the operated position of the auxiliary PTO clutch 15.

In these manners, the invention may be embodied in any other manner as described above. Further changes or modifications will be apparent for those skilled in the art from the foregoing disclosure within the scope of the invention defined in the appended claims.

What is claimed is:

1. A work vehicle comprising:
   a vehicle body supported by a plurality of wheels;
   an engine supported by the vehicle body;
   a PTO shaft driven by power from the engine;
   an operator's seat supported by the vehicle body and movable from a seated position to a non-use position;
   an operator's presence sensor capable of detecting the seated position, a non-seated position, and the non-use position of the operator's seat;
   an engine stop unit operable to automatically stop the engine in response to detection by the operator's presence sensor of the non-seated position of the operator's seat; and
   an override unit operable to override the automatic engine stop function of the automatic engine stop unit, the override unit providing an override signal to the automatic engine stop unit in response to detection by the operator's presence sensor of the non-use position of the operator's seat.

2. The work vehicle according to claim 1, wherein said operator's presence sensor has a predetermined presence-detecting range and a predetermined absence-detecting range.

3. The work vehicle according to claim 1, wherein if a forward or reverse state of a switch over unit is detected when the operator's presence sensor detects the non-use position of the operator's seat, the automatic engine stop unit stops the engine in spite of the presence of the override signal.

4. The work vehicle according to claim 1, wherein the non-use position of operator's seat is a turned-over position.

* * * * *